J. C. EAKENS.
WHEEL TIRE.
APPLICATION FILED JULY 29, 1915.

1,260,166.

Patented Mar. 19, 1918.
2 SHEETS—SHEET 1.

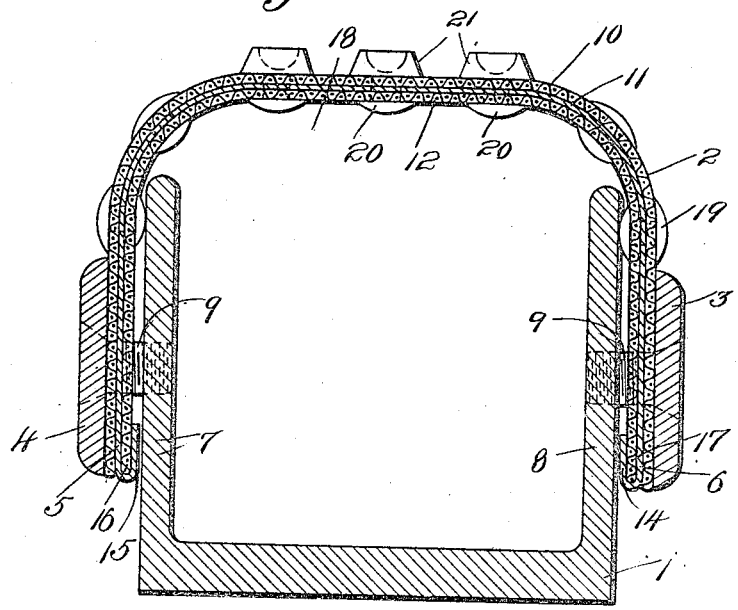
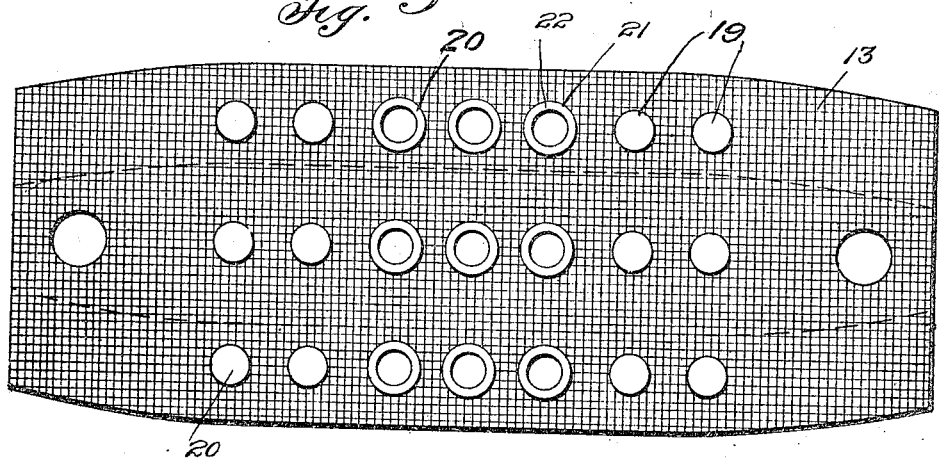

UNITED STATES PATENT OFFICE.

JAMES C. EAKENS, OF MINGO JUNCTION, OHIO, ASSIGNOR OF ONE-HALF TO E. C. BRANDFOSS, OF STEUBENVILLE, OHIO.

WHEEL-TIRE.

1,260,166.

Specification of Letters Patent.

Patented Mar. 19, 1918.

Application filed July 29, 1915. Serial No. 42,624.

*To all whom it may concern:*

Be it known that I, JAMES C. EAKENS, a citizen of the United States, residing at Mingo Junction, in the county of Jefferson and State of Ohio, have invented certain new and useful Improvements in Wheel-Tires, of which the following is a specification.

This invention relates to improvements in wheel tires and has for its object to provide a tire formed of a plurality of layers of woven metal fabric having an intermediate cushioning fabric.

Another object of the invention is to provide a wheel tire formed of a woven fabric composed of asbestos and hemp and having layers of woven metal on both sides thereof.

Still another object of the invention is to provide a tire formed of a plurality of layers of fabric riveted together, the rivet heads forming anti-skid devices.

With the above and other objects in view which will hereinafter more fully appear, I have invented the device illustrated in the accompanying drawings in which—

Fig. 2 is a transverse section on line A—A Fig. 1, and

Fig. 3 is a detail plan view of one section of woven metal fabric.

Figure 1:
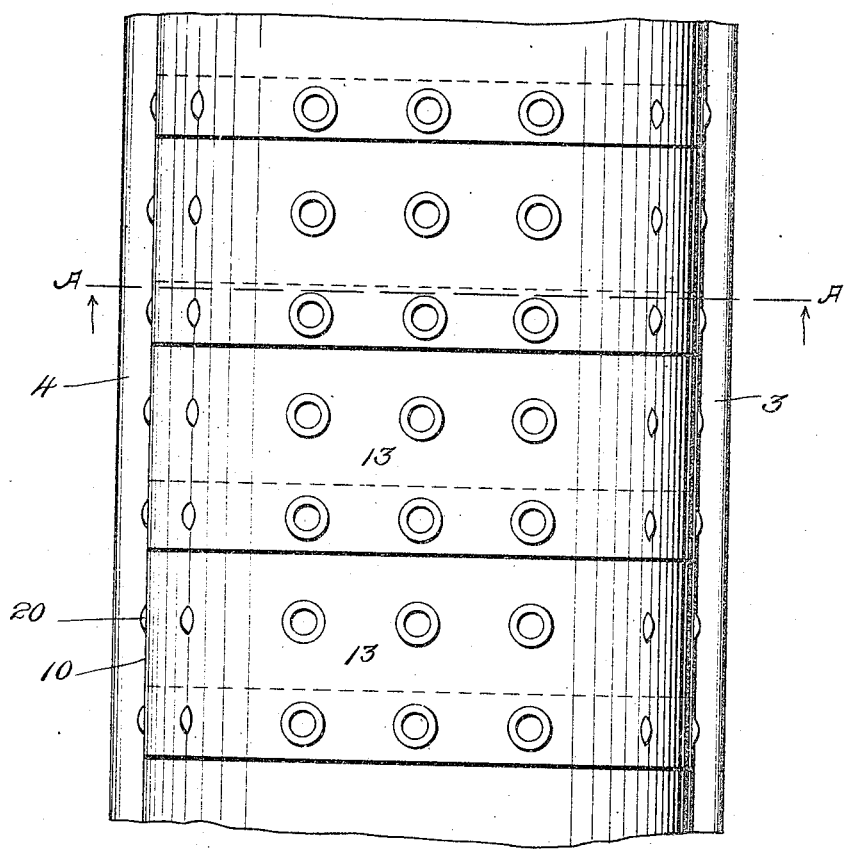
Figure 1 is a plan view of a portion of a tire.

Like reference characters indicate like parts throughout the specification and in the several views in the drawings in which 1 indicates a channel rim to which is secured a fabric tire 2 by means of rings 3 and 4 held against the edges 5 and 6 of the tire 2 and to the flanges 7 and 8 of the rim 1 by means of screws 9 having heads countersunk in the said rings.

The tire 2 is formed of an outer shoe 10, an intermediate fabric 11 formed of high pressure hemp and asbestos woven together and an inner casing 12. The shoe 10 and casing 12 are each formed of a series of transverse sections 13, of closely woven flat or round wire the longitudinal edges of which overlap one another. The edges 14 and 15 of the member 11 project beyond the edges 16 and 17 of the member 12 and are turned over and inwardly thereof so as to form gaskets to provide air tight closures for the space 18, said member 11 being impervious to both air and water.

The several sections of the tire 2 are held together by means of rivets 19 and 20, the latter being tread rivets and are provided with outer heads 21 formed cup shaped whereby gripping edges 22 are formed which provide anti-skidding devices for the tire. Certain rivets 19 oppose and bear on the outer faces of the side walls 7 and 8 adjacent their peripheries constituting bearing members for coöperation with the inturned edges 14 in sustaining the tread member parallel to the sides of the rim member and also in supporting the tread off the peripheral edges of said walls 7 and 8.

Having now described my invention that which I claim to be new and desire to procure by Letters Patent is:—

1. In combination, a channel member, and a tread member secured over the free outer edges of the flanges of said channel member and comprising a plurality of layers, one of which has its edges extended and folded back over the inner face of the inner layer to seal the joints between the tread member and the side faces of the channel member.

2. In combination, a channel member, and a tread member secured over the free outer edges of the flanges of said channel member and comprising a plurality of metallic layers and an interposed layer of asbestos woven with a vegetable fiber, said interposed layer having its side edges extended beyond and folded over the inner metallic layer to seal the joint between the latter and the side faces of the channel member.

3. In combination, a tread member consisting of spaced metallic layers and an interposed fabric layer, a channel member, and means for securing the tread member to the side faces of the channel member, the flanges of the latter extending substantially to the tread surface of said tread member.

4. In combination, a tread member consisting of spaced metallic layers and an interposed fabric layer, a channel member, the side edges of the fabric layer being extended beyond the edges of the metallic layers and turned in over the inner metallic layer to lie between the latter and the side faces of the channel member for serving as a seal therebetween, and rivets for securing the tread layers together.

5. In combination, a rim member, a flexible tread member encircling the same and extending inwardly over its sides, means for securing the inner edges of the tread member to the sides of the rim member, and members carried by the tread member for bearing against the sides of the rim member outwardly of said means and adjacent the outer periphery of the rim member.

6. In combination, a channel member, and a tread member secured over the free outer edges of the flanges of said channel member and comprising a plurality of layers, one of which has its edges extended and folded back to lie between the sides faces of the channel member and the tread member to seal the joints therebetween, and side rings secured to the sides of the channel member to clamp the folded edges of the tread member thereagainst.

In testimony whereof I affix my signature in the presence of two witnesses.

JAMES C. EAKENS.

Witnesses:
EDWARD C. BRANDFARS,
ORU R. MOORE.

Copies of this patent may be obtained for five cents each, by addressing the "Commissioner of Patents, Washington, D. C."